United States Patent [19]

Berti

[11] Patent Number: 5,613,707
[45] Date of Patent: Mar. 25, 1997

[54] METHOD OF ARRANGING A GAS BAG IN A COMPARTMENT

[75] Inventor: Dietmar Berti, Schechingen, Germany

[73] Assignee: TRW Occupant Restraint Systems GmbH, Alfdorf, Germany

[21] Appl. No.: 559,198

[22] Filed: Nov. 13, 1995

[30] Foreign Application Priority Data

Nov. 15, 1994 [DE] Germany .................. 44 40 844.7

[51] Int. Cl.$^6$ .................................................. B60R 21/16
[52] U.S. Cl. .................................................. 280/743.1
[58] Field of Search ........................... 280/743.1, 731, 280/732

[56] References Cited

U.S. PATENT DOCUMENTS

| | | | |
|---|---|---|---|
| 5,022,675 | 6/1991 | Zelenak, Jr. et al. | 280/743.1 |
| 5,140,799 | 8/1992 | Satoh | 280/743.1 |
| 5,162,035 | 11/1992 | Baker | 280/743.1 |
| 5,163,893 | 11/1992 | Hara et al. | 280/743.1 |
| 5,240,282 | 8/1993 | Wehner et al. | 280/728.1 |
| 5,290,061 | 3/1994 | Bollaert | 280/743.1 |
| 5,348,341 | 9/1994 | Webber | 280/743.1 |
| 5,378,019 | 1/1995 | Smith et al. | 280/743.1 |
| 5,425,551 | 6/1995 | Hawthorn | 280/743.1 |
| 5,425,552 | 6/1995 | Linder | 280/743.1 |

FOREIGN PATENT DOCUMENTS 2251493  5/1977  European Pat. Off. .

*Primary Examiner*—Kenneth R. Rice
*Attorney, Agent, or Firm*—Tarolli, Sundheim, Covell, Tummino & Szabo

[57] ABSTRACT

A method of translating a gas bag (5) for a vehicle occupant restraining system which when inflated is three-dimensional in shape, the one wall of which featuring an inflation port (20) may be spread out flat in the deflated condition, into a shape adapted to the interior space of a receiving compartment, is characterized by the wall being rolled up inwardly in its spread-out condition up to the inflation port (20), starting from its outer periphery.

6 Claims, 2 Drawing Sheets

METHOD OF ARRANGING A GAS BAG IN A COMPARTMENT

The invention relates to a method of arranging a gas bag of a vehicle occupant restraining system for accommodation in a compartment.

The invention relates also to a device for implementing this method.

In the production of an airbag or, more precisely, a gas bag for a vehicle occupant restraining system, the bag is ordinarily folded manually, this being substantially done as follows: the bag is secured to a stand by a securing plate surrounding its inflation port and spread out on a folding table in a deflated, flattened condition. Then, folding paddles separately hinged to the stand are pivoted down one after the other onto the spread-out bag, and the bag is folded over each folding edge formed by these folding paddles. Due to the sequence of hinging down the corresponding folding paddles and folding the bag accordingly, the bag is translated from its original, spread-out shape into a folded shape, in which it can be deposited in the interior space of a receiving compartment. On completion of folding the folding paddles are withdrawn from the folded bag.

This method according to prior art which may be employed for the bags on both the driver's side and the front passenger's side has several drawbacks. Firstly, actuating the folding paddles is an activity which is ergonomically difficult. Furthermore, there is the risk in using the folding paddles that the bag is damaged during folding should the folding paddles have a sharp edge. Finally, such a method of folding, necessitating roughly 20 steps in folding, is a time-consuming operation. Known folding methods take up between 2 and 4 minutes depending on the size and the way in which the bag is mounted.

Lately, automated folding devices also find application, which operate with complicated three-dimensional folding movements, thus eliminating the folding paddles. Unwanted fabric folds which are eliminated manually when folding is done by hand, are got rid of in automatic folding by combined action of compressed air and vacuum. However, these automated folding methods are able to reduce the time needed for folding only slightly; in addition, the devices are highly expensive due to the relatively complicated sequence of movements needed in folding.

The object of the invention is to substantially reduce the processing time needed in translating a gas bag from a spread-out condition into a shape adapted to the interior space of a receiving compartment.

According to the invention, a method of arranging a gas bag of a vehicle restraint system for accommodation in a compartment is provided wherein the gas bag, in a deflated condition, is generally flat and has an outer periphery, an inflation opening being defined in a wall portion of the gas bag. The method comprises the steps of holding the bag in a spread-out state and rolling the bag inwardly towards the inflation opening, starting from the outer periphery.

By employing a rolling movement instead of a plurality of folds to be made in sequence about separate folding lines the complete procedure may be implemented substantially in a single step, which substantially reduces the handling time needed.

Preferably the rolling-up movement is oriented substantially parallel to the plane of the spread-out wall.

It may be provided for that the rolling-up movement is commenced at one periphery of the spread-out wall and continued substantially along a spiral path.

It may also be provided for that the rolling-up movement commences at the complete outer periphery and is continued inwardly consistent.

Preferably, the wall may be re-rolled at least partially, after having been rolled up.

In accordance with one preferred embodiment the wall having in the spread-out condition a peripheral contour other than circular is contoured by folding or partial rolling up of the peripheral edge more or less circular before the rolling-up movement is commenced.

Preferably, the rolled-up gas bag is deposited in a receiving compartment so that it does not tend to unroll.

The invention also provides a device for implementing the method. This device comprises a funnel-shaped guide engaging the outer periphery of the bag and driving means for advancing said the bag along an axis of the guide towards a small base thereof, simultaneously rolling up the bag inwardly towards its inflation opening, starting from its outer periphery.

The advantages and features of the invention will be evident in particular from the following description with reference to the enclosed drawing in which:

FIGS. 1a thru 1d are schematic views of a gas bag of the first kind in four different steps of rolling it up, each in cross-section;

In FIGS. 1 and 2 four different steps in rolling up a gas bag 5 of the first kind are shown, the wall of the gas bag being provided with an inflation port 20. In the FIGS. 1a and 2a the gas bag 5 is shown in a deflated, spread-out condition. In the FIGS. 1b, 1c as well as 2b, 2c the gas bag 5 is shown in partial rolled-up conditions, and in the FIGS. 1d and 2d the gas bag 5 is depicted in its completed rolled-up form. As can be seen from the FIGS. 1a thru 1d and 2a thru 2d the gas bag 5 is rolled up by progressively rolling up the wall maintained spread out, beginning at its outer periphery, inwards towards its inflation port 20 sufficiently, so that it may be accommodated in the interior space provided for it in the receiving compartment.

Figure 1A:
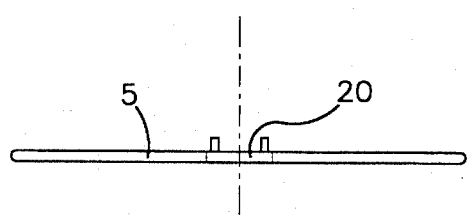
Figure 2A:
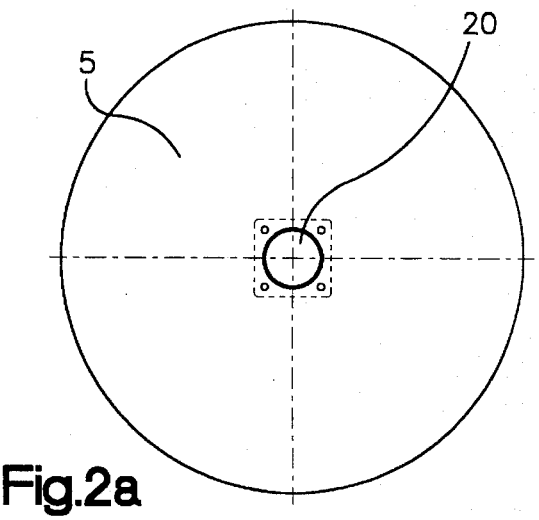
FIG. 2 is a plan view of the gas bag shown in FIG. 1.
Figure 1B:
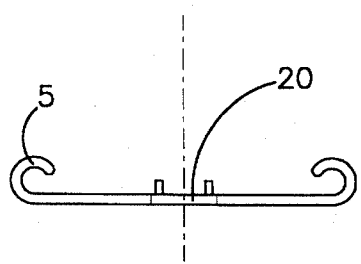
Figure 2B:
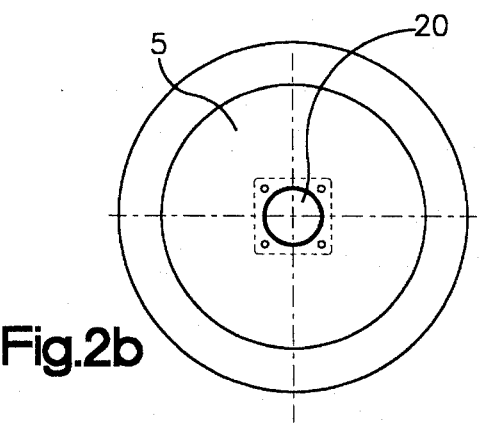
Figure 1C:
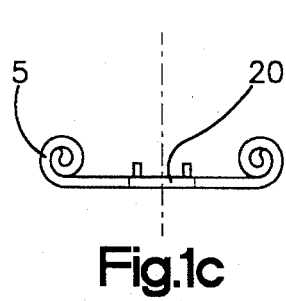
Figure 2C:
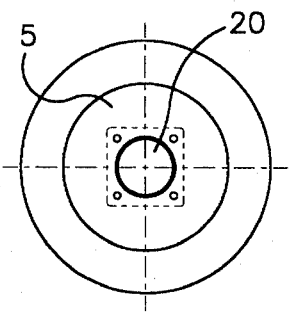
Figure 1D:
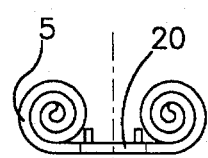
Figure 2D:
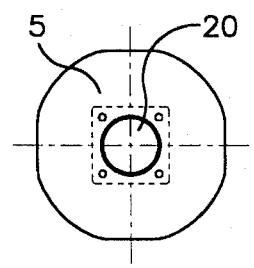
Figure 3:
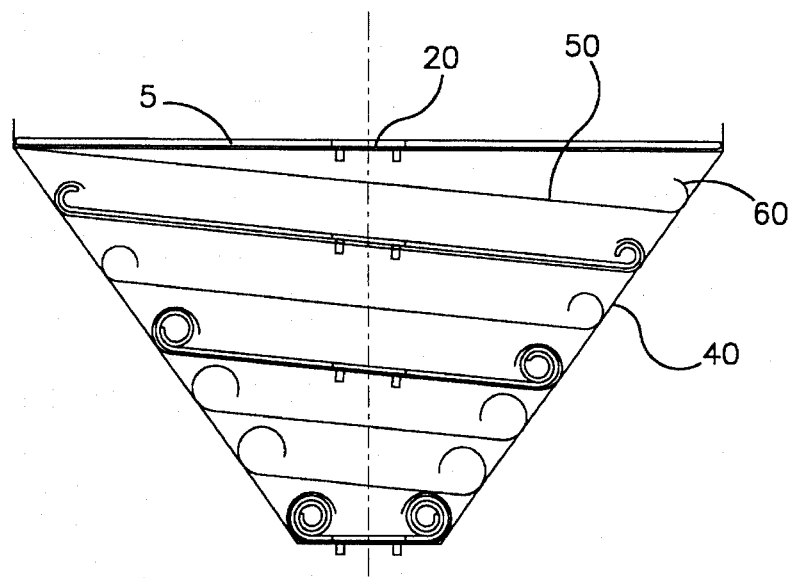
FIG. 3 is a schematic view of a guide funnel with a gas bag located therein in four different steps of rolling it up.

This rolling up action may be done in a rolling-up device shown schematically in FIG. 3. This rolling-up device comprises a guide funnel 40 as well as a feeder means (not shown) for the gas bag 5. The guide funnel 40 has the form of a truncated cone and is provided on its inside with a support 50 which extends in the form of a screw thread along the inside of the guide funnel 40. At the junction between the support 50 and the inside of the guide funnel 40 a projection 60 is disposed, which extends from the junction back above the support 50 such that in the region of the junction a shaping section for the rolled-up wall sections of the gas bag 5 is formed. Since the support 50 extends in the form of screw thread along the inside of the guide funnel 40, the shaping section formed by the projection 60 also extends in the form of screw thread along the inside of the guide funnel 40. Along the center line of the guide funnel 40 adequate space is provided so that the feeder means is able to move along the center line.

The method according to the invention may be implemented as follows (with particular reference to FIG. 3 showing a gas bag 5 in several stages of a rolling-up procedure): the gas bag 5 is fed by a relative rotation between the gas bag 5 (and the feeder means connected thereto) and the guide funnel 40 from the inlet end of the guide funnel 40 axially to its outlet end, the wall maintained spread out being thereby rolled up, beginning at its outer periphery, inwardly towards its inflation port.

The rolling-up movement materializes from a suitable coaction of thread pitch, relative speed of rotation between guide funnel 40 and gas bag 5 as well as from the suitable advance afforded by the feeder means.

Figure 4A:
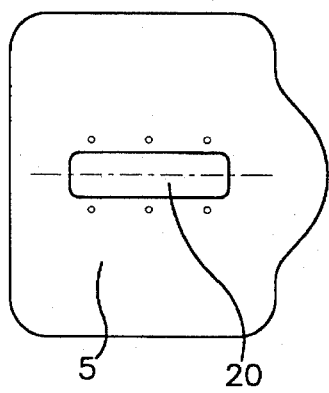
FIG. 4 is a schematic view of a gas bag of the second kind in three different steps in rolling it up, each in plan view.
Figure 4B:
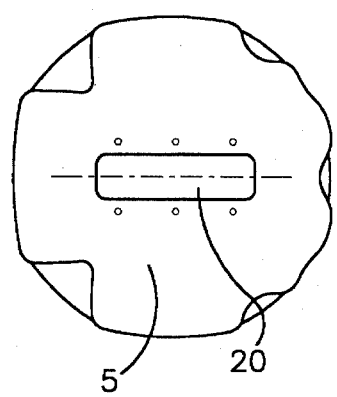
Figure 4C:
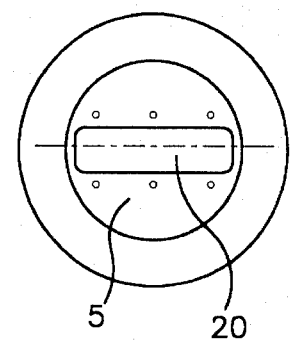

Whilst various rolled-up conditions of a gas bag of a first kind having a circular configuration in the spread-out condition are shown in FIGS. 1 and 2, the method according to the invention may also be employed to roll up a gas bag of a second kind, having a configuration other than circular. One such gas bag 15 having an inflation port 20 is depicted in FIG. 4*a* in the spread-out condition. With this shape too, the method according to the invention is implemented in the way as described above, the wall exhibiting a peripheral contour other than circular in the spread-out condition first being configured more or less circular by folding or partial rolling up of the peripheral edge before the rolling-up movement is commenced.

It may be provided for that the wall of the rolled-up gas bag is re-rolled at least partially subsequent to rolling-up.

On completion of the rolling-up procedure the rolled-up gas bag may be deposited in a receiving compartment provided for its accommodation, so that it is does not tend to unroll.

The method according to the invention has particularly the advantage that the processing time necessary in executing rolling up of a gas bag is reduced to a time period in the order of five seconds.

A gas bag which has been rolled up by the method according to the invention has the advantage that contrary to a gas bag folded according to prior art, in which a substantial part of the wall is located before the inflation port and thus needs to be moved away from the inflation port by the gas pressure within the gas bag when the latter is inflated, the substantial part of the wall of the gas bag according to the invention is disposed surrounding the inflation port 20 so that the gas flow streaming into the bag to inflate it is not first hampered by the wall located to a major extent in front of the inflation port 20.

Contrary to a gas bag folded according to prior art, which during inflation needs to unfold the many folds implemented in folding, a gas bag according to the invention unfolds itself by the turnings of the wall sections produced during rolling up being released by rotation in the opposite direction, thus facilitating unfolding of the gas bag.

Finally, the device according to the invention has the advantage that the movement implemented by it, which is essentially merely a turning movement, is very much easier to execute than the complicated folding movements of the devices according to prior art.

Although the bag is rolled upwardly in the embodiment illustrated in FIG. 1, it is likewise possible to roll the bag downwardly. Also, the rolled condition of the bag may be stabilized by various means, such as pressing and/or streaming, or by means of rollers engaging the bag all around its rolled periphery.

What is claimed is:

1. A method of arranging a gas bag of a vehicle restraint system for accommodation in a compartment, said gas bag, in a deflated condition, being generally flat and having an outer periphery, an inflation opening being defined in a wall portion of said gas bag, comprising the steps of holding said bag in a spread-out state and rolling said bag inwardly towards said inflation opening, starting from said outer periphery.

2. The method of claim 1, wherein said rolling is substantially performed in a plane.

3. The method of claim 1, wherein said rolling is commenced at a peripheral location of said bag and is continued substantially along a spiral path.

4. The method of claim 1, wherein said rolling is commenced all along the periphery of said bag and is continued progressively towards said inflation opening.

5. The method of claim 1, wherein said bag, in a deflated and spread-out condition, has a peripheral contour other than circular, comprising the step of contouring said bag by partially folding inwardly selected portions of said bag to approximate a circular contour, prior to commencing said rolling.

6. A device for arranging a gas bag of a vehicle restraint system for accommodation in a compartment, said gas bag, in a deflated condition, being generally flat and having an outer periphery, an inflation opening being defined in a wall portion of said gas bag, comprising a funnel-shaped guide engaging said outer periphery and driving means for advancing said gas bag along an axis of said guide towards a small base thereof, simultaneously rolling up said bag inwardly towards said inflation opening, starting from said outer periphery.

* * * * *